US012718488B2

(12) United States Patent
Litany et al.

(10) Patent No.: US 12,718,488 B2
(45) Date of Patent: Aug. 25, 2026

(54) SYNTHETIC IMAGE GENERATION FOR SUPPLEMENTING NEURAL FIELD REPRESENTATIONS AND RELATED APPLICATIONS

(71) Applicant: NVIDIA Corporation, Santa Clara, CA (US)

(72) Inventors: Or Litany, Sunnyvale, CA (US); Sanja Fidler, Toronto (CA); Cho-Ying Wu, Los Angeles, CA (US); Huan Ling, Toronto (CA); Zan Gojcic, Zurich (CH); Riccardo De Lutio, Zurich (CH); Sameh Khamis, Alameda, CA (US)

(73) Assignee: NVIDIA Corporation, Santa Clara, CA (US)

( * ) Notice: Subject to any disclaimer, the term of this patent is extended or adjusted under 35 U.S.C. 154(b) by 178 days.

(21) Appl. No.: 18/465,363

(22) Filed: Sep. 12, 2023

(65) Prior Publication Data

US 2025/0086896 A1 Mar. 13, 2025

Related U.S. Application Data

(60) Provisional application No. 63/424,852, filed on Nov. 11, 2022.

(51) Int. Cl.
*G06T 19/00* (2011.01)
*G06T 7/194* (2017.01)
(Continued)

(52) U.S. Cl.
CPC .............. *G06T 19/00* (2013.01); *G06T 7/194* (2017.01); *G06V 10/25* (2022.01); *G06V 10/44* (2022.01); *G06V 10/764* (2022.01); *G06V 10/82* (2022.01)

(58) Field of Classification Search
None
See application file for complete search history.

(56) References Cited

U.S. PATENT DOCUMENTS 11,631,214 B2 * 4/2023 Krishnamurthy ..... G06T 15/205 345/419
11,631,235 B2 * 4/2023 Vianello ............. G06V 20/176 382/154

(Continued)

OTHER PUBLICATIONS

Mildenhall et al., "Nerf: Representing scenes as neural radiance fields for view synthesis", Communications of the ACM, Jan. 2022, 65(1):99%u2013106, Association for Computing Machinery.

(Continued)

*Primary Examiner* — Saptarshi Mazumder
(74) *Attorney, Agent, or Firm* — Foley & Lardner LLP

(57) ABSTRACT

In various examples, systems and methods are disclosed relating to neural networks for three-dimensional (3D) scene representations and modifying the 3D scene representations. In some implementations, a diffusion model can be configured to modify selected portions of 3D scenes represented using neural radiance fields, without painting back in content of the selected portions that was originally present. A first view of the neural radiance fields can be inpainted to remove a target feature from the first view, and used as guidance for updating the neural radiance field so that the target feature can be realistically removed from various second views of the neural radiance fields while context is retained outside of the selected portions.

20 Claims, 6 Drawing Sheets

(51) Int. Cl.

| | |
|---|---|
| ***G06V 10/25*** | (2022.01) |
| ***G06V 10/44*** | (2022.01) |
| ***G06V 10/764*** | (2022.01) |
| ***G06V 10/82*** | (2022.01) |

(56) References Cited

U.S. PATENT DOCUMENTS

| | | | | |
|---|---|---|---|---|
| 2021/0327031 | A1* | 10/2021 | Xie | G06T 5/70 |
| 2023/0074420 | A1 | 3/2023 | Yin et al. | |
| 2023/0153949 | A1 | 5/2023 | Huang et al. | |
| 2023/0377099 | A1 | 11/2023 | Kreis et al. | |
| 2024/0062495 | A1* | 2/2024 | Shu | G06T 17/00 |
| 2024/0249422 | A1* | 7/2024 | Jampani | G06T 7/50 |

OTHER PUBLICATIONS

Poole et al., “Dreamfusion: Text-to-3d using 2d diffusion”, ArXiv, Sep. 2022, abs/2209.14988, International Conference on Learning Representations.

* cited by examiner

SYNTHETIC IMAGE GENERATION FOR SUPPLEMENTING NEURAL FIELD REPRESENTATIONS AND RELATED APPLICATIONS

CROSS-REFERENCE TO RELATED APPLICATIONS

This application claims the benefit of and priority to U.S. Provisional Application No. 63/424,852, filed Nov. 11, 2022, the disclosure of which is incorporated herein by reference in its entirety.

BACKGROUND

Machine learning models, such as neural networks, can be used to represent three-dimensional (3D) environments or scenes. For example, image and/or video data of some portions of the environments can be used to interpolate or otherwise determine more complete 3D representations of environments. However, it can be difficult to perform operations on the 3D representations that change the 3D representations in a manner that maintains consistency and realism throughout the 3D representation.

SUMMARY

Embodiments of the present disclosure relate to neural networks for synthetic image generation, including diffusion models that can be used to update or supplement (e.g., inpaint) neural radiance field (NeRF) representations of 3D environments. In contrast to conventional systems, such as those described above, systems and methods in accordance with the present disclosure can supplement portions of one or more views of the 3D environment to modify or remove objects or other content represented in the 3D environment, including but not limited to vehicles, pedestrians, or buildings, to replace the content with replacement content that can realistically and coherently match remainders of the 3D environment. For example, systems and methods in accordance with the present disclosure can configure (e.g., provide one or more weights and/or one or more biases of) a supplemental generative diffusion model to receive input indicating a class of objects to supplement with replacement, background content in the NeRF, including by inpainting a reference view of the NeRF to guide how the NeRF is updated, and using data structures such as bounding boxes to condition the generative diffusion model to not replace the content to be replaced with the same class of content (e.g., responsive to instructions to remove vehicles, to inpaint regions representing the vehicles with background content, such as parking meters, sidewalks, and greenery, rather than new vehicles).

At least one aspect relates to a processor. The processor can include one or more circuits that can be used to retrieve, from a representation of a three-dimensional (3D) scene, (i) at least one first view of the 3D scene and (ii) at least one second view of the 3D scene. The representation can include, for example and without limitation, a neural network, a NeRF, or an image data structure, such as 3D object model or 3D scene model, or various combinations thereof. e at least one second view can be different from the at least one first view. The one or more circuits can modify the at least one first view based at least on an indication of a feature of the first view to be modified. The one or more circuits can update the representation based at least on the modified at least one first view and the at least one second view. The one or more circuits can cause a simulation to be performed using an updated view retrieved from the updated representation. The one or more circuits can cause presentation of the updated view using a display.

In some implementations, the feature of the at least one first view to be modified includes an object. The one or more circuits can modify the at least one first view by modifying a plurality of pixels of the at least one first view that represent the object, to instead represent a background of the object in the 3D scene.

In some implementations, the feature of the first view is a first feature represented by at least one first pixel of the first view. The at least one first pixel can correspond to a location of the 3D scene. The updated representation can provide the updated view to have at least one second pixel corresponding to the location, that represents a second feature different than the first feature.

In some implementations, the indication of the feature includes a mask corresponding to one or more pixels of the at least one first view representing the feature. In some implementations, the indication of the feature includes at least one of text data or speech data. In some implementations, the one or more circuits can apply a classifier to the at least one of the text data or the speech data to determine a class of features, can identify the feature based at least on the determined class of features, and can modify the at least one first view responsive to identifying the feature.

In some implementations, the one or more circuits can modify the at least one first view by applying the indication of the feature as input to a generative model. In some implementations, the generative model includes a diffusion model that is configured based at least on a first image having a mask, and an indication of a bounding box.

At least one aspect relates to a system. The system can include one or more processing units to execute operations including retrieving, from a representation of a three-dimensional (3D) scene and/or a model representative of the 3D scene, (i) at least one first view of the 3D scene and (ii) at least one second view of the 3D scene, the at least one second view different from the at least one first view; modifying the at least one first view based at least on an indication of a feature of the first view to be modified; updating the representation based at least on the modified at least one first view and the at least one second view; and causing at least one of (i) a simulation to be performed using an updated view retrieved from the updated representation or (ii), presentation of the updated view using a display.

In some implementations, the feature of the at least one first view to be modified includes an object. The one or more processing units can modify the at least one first view by modifying a plurality of pixels of the at least one first view that represent the object, to instead represent a background of the object in the 3D scene.

In some implementations, the feature of the first view is a first feature represented by at least one first pixel of the first view. The at least one first pixel can correspond to a location of the 3D scene. The updated representation can provide the updated view to have at least one second pixel corresponding to the location, that represents a second feature that is different than the first feature.

In some implementations, the indication of the feature includes a mask corresponding to one or more pixels of the at least one first view representing the feature. In some implementations, the indication of the feature includes at least one of text data or speech data. In some implementations, the one or more processing units can apply a classifier to the at least one of the text data or the speech data to determine a class of features, can identify the feature based at least on the determined class of features, and can modify the at least one first view responsive to identifying the feature.

In some implementations, the one or more processing units can modify the at least one first view by applying the indication of the feature as input to a generative model. In some implementations, the generative model includes a diffusion model that generates output based at least on a first image having a mask, and an indication of a bounding box.

At least one aspect relates to a method. The method can include retrieving, by one or more processors, from a representation (e.g., a neural radiance model) of a three-dimensional (3D) scene, (i) at least one first view of the 3D scene and (ii) at least one second view of the 3D scene, the at least one second view different from the at least one first view; modifying, by the one or more processors, the at least one first view based at least on an indication of a feature of the first view to be modified; updating, by the one or more processors, the representation based at least on the modified at least one first view and the at least one second view; and causing, by the one or more processors, at least one of (i) a simulation to be performed using an updated view retrieved from the updated representation or (ii), presentation of the updated view using a display.

In some implementations, the feature of the at least one first view to be modified includes an object. The method can include modifying the at least one first view by modifying a plurality of pixels of the at least one first view that represent the object, to instead represent a background of the object in the 3D scene.

In some implementations, the feature of the first view is a first feature represented by at least one first pixel of the first view. The at least one first pixel can correspond to a location of the 3D scene. The updated view can be provided to have at least one second pixel corresponding to the location, that represents a second feature different than the first feature.

In some implementations, the indication of the feature includes a mask corresponding to one or more pixels of the at least one first view representing the feature. In some implementations, the indication of the feature includes at least one of text data or speech data. In some implementations, the method can include applying a classifier to the at least one of the text data or the speech data to determine a class of features, identifying the feature based at least on the determined class of features, and modifying the at least one first view responsive to identifying the feature.

In some implementations, the method can include modifying the at least one first view by applying the indication of the feature as input to a generative model. In some implementations, the generative model includes a diffusion model that is configured, updated, and/or trained to produce an output based at least on a first image having a mask, and an indication of a bounding box.

The processors, systems, and/or methods described herein can be implemented by or included in at least one of a system associated with an autonomous or semi-autonomous machine (e.g., an in-vehicle infotainment system); a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for generating or presenting virtual reality (VR) content, augmented reality (AR) content, and/or mixed reality (MR) content; a system for performing conversational AI operations; a system that includes one or more language models, such as large language models (LLMs); a system for generating synthetic data; a system incorporating one or more virtual machines (VMs); a system implemented at least partially in a data center; or a system implemented at least partially using cloud computing resources.

BRIEF DESCRIPTION OF THE DRAWINGS

The present systems and methods for machine learning models for synthetic image generation for supplementing neural field representations are described in detail below with reference to the attached drawing figures, wherein.

DETAILED DESCRIPTION

Figure 1:
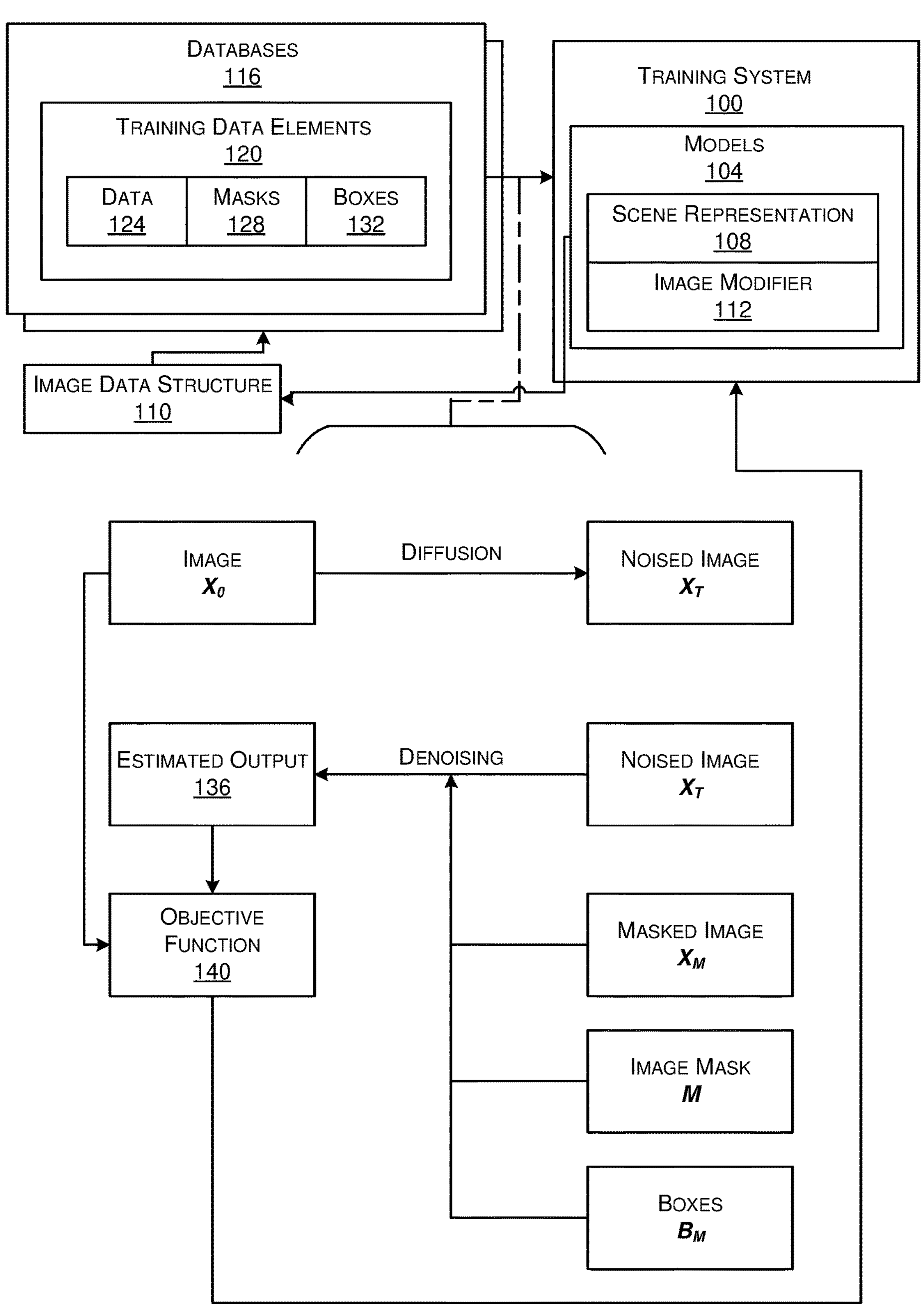
FIG. 1 is a block diagram of an example system for configuring generative diffusion models, in accordance with some embodiments of the present disclosure.

Systems and methods are disclosed related to realistically implementing modifications to models that represent image data, including synthetic image data, such as for modifying or supplementing neural fields. For example, a machine learning model (e.g., a neural network or other machine learning model and/or an image data structure generated by the machine learning model) can include one or more neural radiance fields (NeRF). Each of the one or more NeRFs can be a representation of an object in a three-dimensional (3D) scene, or a 3D representation of the entire scene. The representation (e.g., the NeRF model) can allow for images, such as two-dimensional (2D) or 3D images, to be determined from various views relative to the 3D scene. In some embodiments, an object, such as a vehicle, can be identified in the representation, and the representation can be modified/applied so that the object appears to have been removed. For example, a user query including at least one of an image mask, a semantic class, or a text query can be used to identify objects to be removed. The disclosed systems and methods can allow for more flexible and realistic editing, supplemental, inpainting, or other modifications of many different views relative to the 3D scene. One or more embodiments can be implemented as a hypernetwork, that can be used to predict parameters (e.g., weights and biases) of a NeRF of a scene given a series of input images.

In one or more example implementations, for at least some perspectives, images determined from the image data structure can have pixels which, in a first state of the representation, represent the object; in a second state of the representation, the pixels can be replaced with pixels that (synthetically) represent objects behind the removed object in a manner such that the determined images represent coherent/realistic information. For example, images can be generated with parked cars removed and replaced with representations of features of the environment expected to be present behind the parked car (relative to the perspectives of the images), such as curbs, sidewalks, parking meters, etc.

The images determined from the image data structure, with removed objects, can be used for various further image processing applications. For example, the images can be used for autonomous vehicle simulations and training. This can allow, for instance, training for parking or other specific maneuvers where the underlying images used to generate the image data structure may not necessarily provide an appropriate environment for the maneuvers to be performed.

The representation (e.g., the 3D model for an object and/or scene) can be determined using input images of the scene or object in a 3D environment. For example, the 3D model of an object can be a NeRF determined from at least one of video data or input images from multiple views of the object in the 3D environment. Likewise, the 3D model of a scene can be a NeRF determined from at least one of video data or input images from multiple views of the 3D environment (which itself may include multiple views of one or more objects in the 3D environment). In one or more embodiments, the NeRF for an object or scene may be generated using a neural network from the input data. A plurality of representations (e.g., a plurality of 3D models) can be determined for different objects or portions of the overall 3D environment, and can be associated to local grids representing features of the objects or portions of the overall 3D environment (e.g., to represent semantic information).

An object model (e.g., a representation, such as the NeRF representing the object or scene) can be provided as an input to an image modifier, such as an inpainter. The image modifier can include a generative machine learning model, such as a diffusion model. The image modifier can be trained by being conditioned on masks and/or bounding boxes indicative of portions of images where modification is to be performed, so that the image modifier can perform supplemental synthetic data generation-such as inpainting-without putting back in specific types of features or objects, such as without putting back in vehicles or objects of the same type that was just removed. The image modifier can use both depth and color information.

The system can receive an indication of content to be modified, such as content to be removed. For example, the system can receive an input including at least one of an indication of a mask or a semantic input (e.g., text) corresponding to a mask, where the mask can correspond to objects or other content to be removed. The system can retrieve a reference view of the scene, and can modify the reference view using the image modifier based at least on the input. For example, the system can cause the masked region of the reference view to be supplemented (e.g., inpainted). The system can update the representation (e.g., the representation of the scene) using the reference view so that, for example, various other views of a 3D object model are generated that take into account the modification (e.g., inpainting) represented by the reference view; these views can then be used to update the representation (e.g., 3D model of one or more objects and/or the scene so that the generative machine learning model can output a view from any perspective with the content modified. As such, the system can use the reference view as guidance during the modification to improve view-consistency, and can update the representation of the scene without directly training, for example, an underlying neural network that generates the representation (which may be more computationally intensive).

The systems and methods described herein may be used for a variety of purposes, by way of example and without limitation, for synthetic data generation, machine control, machine locomotion, machine driving, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as systems for performing synthetic data generation operations, automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems implementing one or more language models, such as LLMs, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example computing environment including a system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 can include any function, model (e.g., machine learning model), operation, routine, logic, or instructions to perform functions such as configuring machine learning models 104 as described herein, such as to configure machine learning models to operate as diffusion models and/or inpainting models.

The system 100 can train, update, or configure one or more models 104 (e.g., machine learning models). The machine learning models 104 can include machine learning models or other models that can generate target outputs based on various types of inputs. The machine learning models 104 may include one or more neural networks. The neural network can include an input layer, an output layer, and/or one or more intermediate layers, such as hidden layers, which can each have respective nodes. The system 100 can train/update the neural network by modifying or updating one or more parameters, such as weights and/or biases, of various nodes of the neural network responsive to evaluating candidate outputs of the neural network.

The machine models 104 can be or include various neural network models, including models that are effective for operating on or generating data including but not limited to image data, video data, text data, speech data, audio data, or various combinations thereof. The machine learning models 104 can include one or more transformers, recurrent neural networks (RNNs), long short-term memory (LSTM) models, other network types, or various combinations thereof. The machine learning models 104 can include generative models, such as generative adversarial networks (GANs), Markov decision processes, variational autoencoders (VAEs), Bayesian networks, autoregressive models, autoregressive encoder models (e.g., a model that includes an encoder to generate a latent representation (e.g., in an embedding space) of an input to the model (e.g., a representation of a different dimensionality than the input), and/or a decoder to generate an output representative of the input from the latent representation), or various combinations thereof.

The machine learning models 104 can include at least one scene representation 108. The scene representation 108 can include any data structure, image representation, function, model (e.g., neural network or other machine learning model), operation, routine, logic, or instructions to represent a scene or a portion of a scene, such as one or more objects in a scene (for example, the scene representation 108 can be an object representation, such as a 3D object model, and may or may not include additional objects or environment features relative to the object represented by the 3D object model). For example, the scene representation 108 can include two-dimensional (2D) and/or three-dimensional (3D) image data. The image data can represent a 3D environment, such as a real-world, physical, simulated, or virtual environment. The scene representation 108 can be a data structure that can be queried according to a direction (e.g., a vector representing a direction) and output an image according to the query, such as to output an image that includes image data representing a view of the scene as would be perceived along the direction. In some implementations, the scene representation 108 includes at least one machine learning model (e.g., a neural network, such as a neural radiance field as described herein), which can be used to generate an image data structure 110 as a representation of the scene, object(s), and/or environment. For example, the image data structure 110 can be a data structure that can be queried to retrieve one or more 2D or 3D portions of the representation, such as to retrieve outputs of pixels of the representation. The scene representation 108 can be generated and/or updated using at least one of real or synthetic image data, such as image data captured using image capture devices in a physical/real-world environment, or synthetic image data generated to represent virtual or simulated environments.

For example, the scene representation 108 can include or be implemented as at least one neural radiance field (NeRF). The NeRF can be a neural network configured to determine (e.g., infer) any of a plurality of views of a scene, such as by being trained, configured, and/or updated using one or more images (2D or 3D) and/or video data of the scene, such as by configuring/updating the neural network to be able to output views that are consistent with the provided images and/or video (e.g., data 124 or other image and/or video data). For example, the NeRF can render a view according to at least one of an origin or a direction of the view. The NeRF can render at least one view having a different direction than respective directions of the images and/or video data used to configure the NeRF. In some implementations, the NeRF includes a neural network configured to generate values for the image data structure 110. In some implementations, the NeRF includes at least one of the neural network configured to generate the image data structure 110 or the image data structure 110.

The NeRF can be defined as a function $f_\theta:(p,d)\rightarrow(c,\sigma)$ that maps a 3D location of the scene $p\in\mathbb{R}^3$ and viewing direction $d\in\mathbb{R}^2$ to a volumetric density $\sigma\in[0,\infty)$ and color (e.g., RGB color) $c\in[0,1]^3$. The system 100 can implement the NeRF as at least one neural network that includes one or more multilayer perceptrons (MLPs), such as a single, global MLP, or a plurality of local MLPs each corresponding to a local portion of the scene (e.g., based on local features arranged in a grid). The system 100 can implement the NeRF as a hash table, such as a multiresolution hash positional encoding. The system 100 can configure parameters (e.g., parameters θ) of the NeRF using a loss function, represented as for instance:

$$L_{NeRF}=\frac{1}{|R|}\sum_{r\in R}\|\overline{c}(r)-\hat{c}_\theta(r)\|$$

where $\overline{c}(r)$ represents color (e.g., ground truth color), of the image data used to configure the NeRF, for a camera ray $r=o+td$, where o is an origin point of the ray and t is a indication of distance, and R represents the set of cameras rays (e.g., all rays of a batch). $\hat{c}_\theta(r)$ can represent a candidate output of the NeRF, such as an estimated color rendered using volumetric rendering:

$$\hat{c}_\theta(r)=\int_{t_n}^{t_f}T(t)\sigma(r(t))c(r(t))dt$$

where $$T(t)=\exp\left(-\int_{t_n}^{t_f}\sigma(r(s))ds\right)$$

represents an accumulated transmittance, $t_n$ is a near bound of the scene, and tris a far bound of the scene.

The system 100 can configure the scene representation 108 (and/or the image data structure 110) as a NeRF by modifying the NeRF according to the loss function, such as by applying an optimization algorithm to the NeRF using the loss function to modify the parameters θ until at least one convergence criterion of the optimization algorithm is met. The system 100 can configure the scene representation 108 by applying training data including at least one of image data or video data as input to the scene representation 108, evaluating the loss function, and modifying the parameters θ until the convergence criteria is/are met.

The system 100 can receive queries to retrieve one or more views from the scene representation 108 (or the image data structure 110). For example, the system 100 can receive a query indicating at least one of a camera pose, an origin point, or a direction of a view, and can retrieve the view from the scene representation 108 according to the query. The scene representation 108 can provide multiple views having different points of view (e.g., perspectives corresponding to the at least one of the camera pose, origin point, or direction). For example, the scene representation 108 can provide or output at least a first view of the 3D scene and a second view of the 3D scene that may have different points of view.

The machine learning models 104 can include at least one image modifier 112. The image modifier 112 can include any function, model (e.g., neural network or other machine learning model), operation, routine, logic, or instructions to perform functions such as modifying, pixels, colors, brightness/intensity, size, or other characteristics of images. For example, the image modifier 112 can perform functions such as shading, warping, and/or scaling of images or portions of images. The image modifier 112 can modify at least a portion of an image to modify a scene (or portion of a scene) represented by the portion of the image, such as to remove, replace, or fill in content represented by pixels forming the portion of the image. For example, the image modifier 112 can include an inpainter, which can be configured (e.g., trained) to modify the portion of the image with replacement pixels, such that the portion of the image represents features of the scene behind the content (initially) represented by the portion relative to the direction of the view of the image.

In some implementations, the image modifier 112 implements the inpainter as at least one generative model or neural network, such as at least one diffusion model. The diffusion model can be a continuous time diffusion model. The diffusion model can include a neural network, such as a denoising network. For example, in brief overview, the diffusion model can include a network that is trained, updated, and/or configured using training data that includes data elements to which noise is applied, and configuring the network to modify the noised data elements to recover the (un-noised) data elements.

The system 100 can operate on training data elements 120 (e.g., training data instances), which may be retrieved from one or more databases 116. The one or more databases 116 can be maintained by one or more entities, which may be entities that maintain the system 100 or may be separate from entities that maintain the system 100. In some implementations, the system 100 uses training data from different data sets, such as by using training data elements 120 from a first database 116 to perform at least a first configuring (e.g., updating or training) of the machine learning models 104, and uses training data elements from a second database 116 to perform at least a second configuring of the machine learning models 104. For example, the first database 116 can include publicly available data, while the second database 116 can include domain-specific data (which may be limited in access as compared with the data of the first database 116).

The training data elements 120 can include data 124. The data 124 can include, without limitation, text, speech, audio, image, and/or video data. The system 100 can perform various pre-processing operations on the data 124, such as filtering, normalizing, compression, decompression, upscaling or downscaling, cropping, and/or conversion to grayscale (e.g., from image and/or video data 124). Images (including video) of the data 124 can correspond one or more views of a scene captured by an image capture device (e.g., camera), or images generated computationally, such as simulated or virtual images or video (including by being modifications of images from an image capture device). The images can each include a plurality of pixels, such as pixels arranged in rows and columns. The images can include image data assigned to one or more pixels of the images 116, such as color, brightness, contrast, intensity, depth (e.g., for three-dimensional (3D) images), or various combinations thereof.

The training data elements 120 can include at least one mask 128. The masks 128 can correspond to respective data 124. For example, the masks 128 can be masks associated with respective images (or video frames) of the data 124. The mask 128 can be a data structure indicating locations corresponding to the data 124, such as locations forming a border around an object represented by the data 124 and/or identifying a subset of pixels of the data 124 forming the border. The masks 128 can indicate regions, such as bounded regions of subsets of pixels of the data 124, to be modified or excluded relative to a remainder of the data 124. The masks 128 can be binary masks, such as data structures indicating a value of 0 or 1 for each of a plurality of pixels of the data 124. For example, the masks 128 can include image data structures having values of 0 or 1 for each pixel of the plurality of pixels. The masks 128 can have a same format (e.g., same rows and columns of pixels) as the data 124, or may be of a different format (e.g., the pixels of the mask 128 can map to a subset of pixels of the data 124).

In some implementations, at least a subset of the masks 128 are located to border (e.g., form a boundary around) one or more objects or classes of objects. For example, the subset can include masks 128 corresponding to vehicles, pedestrians, signs, roads, buildings, or other objects represented by the data 124. The subset of masks 128 can be determined by a segmentation algorithm, or can be retrieved from a mask database 116 associated with the data 124. In some implementations, at least a subset of the masks 128 are generated randomly, such as to form a large mask (e.g., masks of at least ten percent, at least twenty percent, at least thirty percent, etc., of the data 124). By using masks 128 corresponding to objects and masks 128 that are randomly generated, the system 100 can allow the image modifier 112 to perform inpainting without inpainting objects to be removed (e.g., foreground objects, such as vehicles) back into the images.

The training data elements 120 can include at least one box 132 (e.g., bounding box). The boxes 132 can correspond to respective data 124, such as to be associated with respective images (or video frames) of the data 124. The boxes 132 can correspond to one or more objects or classes of objects (e.g., in a manner similar to the masks 128). The boxes 132 can be determined in various manners, including but not limited to by using a box mapping algorithm or retrieving the boxes 132 from a bounding box database 116 associated with the data 124 (e.g., a database including manually determined bounding boxes). The boxes 132 can indicate rectangular subsets of pixels of the data 124 (e.g., for two-dimensional images) or cuboid subsets of pixels of the data 124 (e.g., for three-dimensional images). For example, the boxes 132 can include data structures representing a plurality of corners or edges of the boxes 132, such as an upper-left and lower-right corner for a two-dimensional bounding box 132. The boxes 132 can be labeled with an identifier of the object that the boxes 132 form a boundary around, such as an identifier of a class or category of the object.

The boxes 132 can correspond to the masks 128. For example, one or more boxes 132 can be formed to bound/enclose a same object as one or more masks 128. This can enable the system 100 to configure the image modifier 112 to determine masks from bounding boxes.

Referring further to FIG. 1, the system 100 can configure the image modifier 112, such as to configure/update/train the image modifier 112, using the training data elements 120. The system 100 can apply noise to the data 124 to generate modified data, and can modify the image modifier 112 to meet one or more criteria associated with (i) outputs of the image modifier 112 generated responsive to receiving the modified data as input and (ii) the data 124. For example, as noted above, the image modifier 112 can include a denoising network, which can be configured by evaluating the modified data and data 124 using a loss function (e.g., objective function 136) and applying an optimization algorithm to modify the image modifier 112 according to outputs of the loss function.

As depicted in FIG. 1, the system 100 can perform diffusion on the data 124. For example, the system 100 can perform diffusion on one or more images $x_0$ of the data 124. The system 100 can perform diffusion by applying noise to (e.g., diffusing) the data 124, to determine training data points (e.g., diffused or noised data, such as noised images $x_T$). For example, the system 100 can add the noise to the data 124 (e.g., add a numerical value representing the noise in a same data format as the data 124, to the data 124) to determine the training data points. The system 100 can determine the noise to add to the data 124 using one or more noise distributions, which may indicate a noise level according to a time t, where $0<t<T$, such that applying noise corresponding to the time T may result in the training data point $x_T$ representing Gaussian noise. For example, the noise can be a sample of a distribution, such as a Gaussian distribution. The system 100 can apply the noise according to or with respect to a duration of time t. The duration of time t can be a value in a time interval, such as a value between zero and a maximum T of the time interval. The duration of time t may be a multiple of a number of discrete time steps between zero and T. The maximum T may correspond to an amount of time such that the result of applying noise for a duration of time T may be indistinguishable or almost indistinguishable from Gaussian noise. For example, as depicted in FIG. 1, the training system 100 can apply diffusion to the image $x_0$ for the duration T to determine the training data point (e.g., noised image) $x_T$.

The image modifier 112 can be or include at least one denoising network (e.g., neural network) to perform denoising of the training data point $x_T$ to determine an estimated output 136, as depicted in FIG. 1. The denoising network can be implemented using a U-Net, such as a convolutional neural network that includes downscaling and upscaling paths. The estimated output 136 can have a same format as the data 124 and the training data point $x_T$, such as to be an image having a same number of rows of pixels and columns of pixels as the data 124 and the training data point $x_T$.

In some implementations, the image modifier 112 performs denoising of the training data point $x_T$ based at least on a mask 128 (e.g., image mask M as shown in FIG. 1) corresponding to the data 124 used to determine (e.g., by diffusion) the training data point $x_T$. For example, the system 100 can provide, as input to the image modifier 112, the training data point $x_T$ and at least one of the mask 128 or a masked image $x_M$, where the system 100 determines the masked image $x_M$ by applying the mask 128 to the image $x_0$ (e.g., the clean image of data 124 before diffusion). In some implementations, the system 100 concatenates the mask 128 and the masked image $x_M$ to the training data point $x_T$ to provide the concatenated training data point $x_T$ as input to the image modifier 112. As such, the system 100 can condition and/or guide the image modification (e.g., inpainting) process that the image modifier 112 is trained to perform using the masks 128. The system 100 can condition the configuration of the image modifier 112 on various inputs including, without limitation, text and/or semantic labels.

In some implementations, the system 100 can provide, as input to the image modifier 112 for denoising, one or more of the boxes 132. For example, the system 100 can provide a box 132 corresponding to the data 124 used to determine the training data point $x_T$ as input to the image modifier 112 (e.g., together with the training data point $x_T$ and the at least one of the mask 128 or the masked image $x_M$). In some implementations, the system 100 provides the box 132 using a cross-attention process. For example, the system 100 can apply the box 132 using cross-attention to one or more layers of the neural network of the image modifier 112. This can allow the training of the image modifier 112 to be conditioned on the boxes 132, such as to prevent the image modifier 112 from being configured to inpaint objects in the boxes 132 (e.g., foreground objects, such as vehicles).

The system 100 can configure (e.g., train, modify, update, etc.) the image modifier 112 based at least on the training data points (e.g., noised images $x_T$) and the estimated outputs. For example, the system 100 can use various objective functions 136, such as cost functions or scoring functions, to evaluate estimated (e.g., candidate) outputs that the image modifier 112 determines (e.g., generates, produces) in response to receiving the training data points as input, and performing a comparison of the estimated outputs with the data 124 used to determine the training data points. For example, the system 100 can use an objective function 136 that performs a comparison of noisy images represented by the training data points with original images of the data 124. The system 100 can update the image modifier 112 responsive to the objective function 136, such as to modify the image modifier 112 responsive to whether the comparison between the estimated outputs and the corresponding data 124 satisfies various convergence criteria (e.g., an output of the objective function is less than a threshold output or does not change more than a predetermined value over a number of iterations; a threshold number of iterations of training is completed; the image modifier 112 satisfies performance criteria (e.g., with respect to output quality, accuracy of a downstream classifier operating on the output of the image modifier 112, etc.)). The objective function can include, for example and without limitation, a least squares function, an L1 norm, or an L2 norm. The objective function can receive, as input, at least (1) the estimated output of the image modifier 112 determined responsive to the training data point $x_T$ and (2) the data 124 (e.g., $x_0$) used to determine the training data point, and can determine an objective value as output responsive to the input.

In some implementations, to evaluate processing by the image modifier 112 of a training data point $x_T$ (e.g., from diffusion of a given data 124, such as a given image $x_0$), the system 100 uses the objective function:

$$L_{DM} = \mathbb{E}_{x,\epsilon\sim N(0,1),t}\left[w\|\epsilon - \epsilon_\theta(\alpha_t x_0 + \sigma_t \epsilon, t)\|_2^2\right]$$

where $\epsilon_\theta(\ )$ is a function to determine (e.g., predict) noise $\hat{\epsilon}$ from the training data point $x_T$ (e.g., using the denoising network of image modifier 112), and $\alpha_t$, $\sigma_t$ are parameters (e.g., scalar parameters) representing a target noise level for the time t. For example, the system 100 can use $\alpha_t$, $\sigma_t$ such that the learned distribution is close to the data distribution of data 124 for relatively small values of t (e.g., t~0) and close to a standard normal for t~T. In some implementations, $\alpha_t^2=1-\sigma_t^2$, which can preserve variance.

In some implementations, the objective function can be re-parameterized, such as to mitigate shifts in color (e.g., RGB color) distribution that might otherwise result from the image modification performed by the image modifier 112. For example, the system 100 can use the objective function:

$$L_{DM} = \mathbb{E}_{x,\epsilon \sim N(0,1),t}\left[w\|v - \upsilon_{\phi}(\alpha_t x_0 + \sigma_t \epsilon, y, x_m, m, t)\|_2^2\right]$$

where v is defined as $$v = \frac{\epsilon - \sigma_t x_t}{\alpha_t},$$

and $\upsilon_{\phi}$ is the denoising network (e.g., U-Net) of the image modifier 112.

The system 100 can apply various machine learning model optimization or modification operations to modify the image modifier 112 responsive to the outputs of the objective function. For example, the system 100 can use a gradient descent operation, such as stochastic gradient descent.

In some implementations, the system 100 uses at least some different subsets of the data 124 to configure the image modifier 112. For example, the system 100 can use a first subset, such as a first batch, of the data 124 to perform a first configuration of the image modifier 112, and a second subset, such as a second batch, of the data 124 to perform a second configuration of the image modifier 112. The first subset and second subset may be from the same or different databases 116, such as different databases 116 having different levels of public accessibility. The first subset may be a training dataset, and the second subset may be a test or validation subset.

Figure 2:
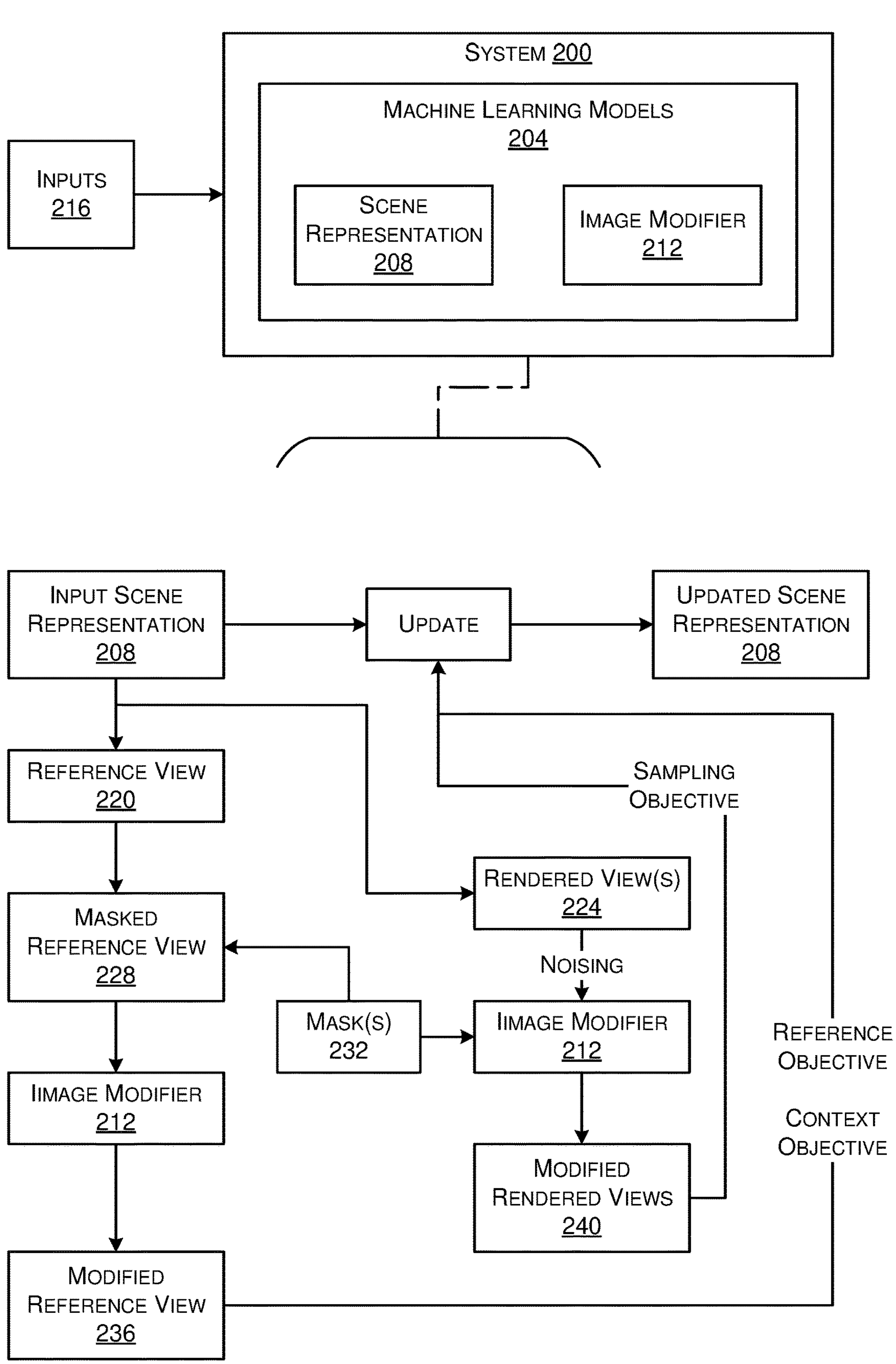
FIG. 2 is a block diagram of an example system for configuring NeRFs, in accordance with some embodiments of the present disclosure.

Now referring to FIG. 2, FIG. 2 depicts an example computing environment including a system 200, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 200 can include any function, model (e.g., machine learning model), operation, routine, logic, or instructions to perform functions such as configuring, deploying, updating, and/or generating outputs from machine learning models 204, including scene models 208, as described herein. The system 200 can incorporate features of the system 100, such as to facilitate periodic updating or modifications of the machine learning models 204. The system 200 can be implemented at least partially by the same or different entities or devices that implement the system 100.

The system 200 can include at least one machine learning model 204. The machine learning model 204 can include the machine learning model 104 and/or the image modifier 112 of FIG. 1 or a representation thereof. For example, in the system 200, the machine learning model 204 can include a scene representation 208 and an image modifier 212, which can respectively incorporate features of the scene representation 108 (and/or the image data structure 110) and the image modifier 112).

The machine learning models 204 (e.g., scene models 208 and/or image modifiers 212) can be received from the system 100 of FIG. 1 as a data structure that includes the machine learning model 104 or a representation thereof, such as a data structure representing the structure of the machine learning model 104 (e.g., layers or arrangements of layers) or the parameters of the machine learning model 104. In some implementations, the system 200 can configure the scene representation 208 and/or image modifier 212 to be capable of updating the scene representation 208, such as a NeRF of the scene representation 208, to render views of the 3D scene in which targeted portions of the views are effectively inpainted to remove targeted objects or features of the 3D scene, such as to facilitate rendering views in which vehicles or other objects are replaced with background image information in a manner that provides a seamless representation of the 3D scene.

The system 200 can receive one or more inputs 216. The inputs 216 can indicate one or more features of output for the machine learning model 104 to generate, such as one or more features of one or more views of the scene representation 208 to be modified (e.g., inpainted). The inputs 216 can be received from one or more user input devices that may be coupled with the system 200. The inputs 216 can include any of a variety of data formats, including but not limited to text, speech, audio, image, or video data indicating instructions corresponding to the features of output for the machine learning model 204 to generate. For example, the inputs 216 can indicate, for example and without limitation, information regarding portion(s) of a scene to be masked and/or inpainted, such as vehicles in a foreground of a 3D scene to be removed and inpainted, for one or more views of the 3D scene as represented by the scene representation 208, with image data representing background features relative to the foreground from a perspective (e.g., origin and/or direction) of the respective one or more views. In some implementations, the system 200 presents a prompt requesting the one or more features via a user interface, and receives the inputs 216 from the user interface. The inputs 216 can be received as semantic information (e.g., text, voice, speech, etc.) and/or image information (e.g., input indicative of pixels indicating regions for masking and/or inpainting). As some examples, the inputs 216 may be received as an instruction to remove all vehicles from at least a portion of a 3D scene, or to remove all vehicles having a selected color from the 3D scene or a portion thereof, or to remove all vehicles parked on the side of streets (e.g., in front of parking meters) (while retaining vehicles parked in parking structures). In some implementations, the system 200 identifies the masks (e.g., masks 232 as described further herein) from the inputs 216; for example, the scene representation 208 may be trained and/or configured (e.g., by conditioning on mask segmentation) using one or more semantic channels by which the inputs 216 are received as semantic information. In some implementations, the system 200 applies the inputs 216 to a classifier and/or segmentation algorithm (e.g., segmentation neural network) to determine the masks. For example, the classifier can include any function, policy, model (e.g., neural network model), algorithm, or various combinations thereof to identify a class of features (e.g., identify vehicle class), and the system 200 can use the class to determine masks for features represented in one or more views of the scene representation 208 that corresponds with the identified class. The inputs 216 and/or the masks 232 can indicate one or more pixels corresponding to one or more 3D locations of the 3D scene.

As depicted in FIG. 2, the system 200 can update an input scene representation 208 to determine an updated scene representation 208 that is modified (e.g., inpainted) according to the input(s) 216. The input scene representation 208 can be based on the scene representation 108, such as to be a configured scene model, such as a NeRF, prior to modification by inpainting by the image modifier 112.

The system 200 can determine at least one reference view 220 associated with the (input) scene representation 208. The system 200 can retrieve the reference view 220 from the scene representation 208 by querying the scene representation 208 using at least one of an origin or a direction, or can identify one or more reference views 220 from image data and/or video data used to determine the scene representation 208. The system 200 can retrieve the at least one reference view 220 in various manners, such as randomly, or responsive to inputs 216 indicating the at least one of the origin or the direction, or responsive to inputs 216 indicating an identifier of the reference view.

In some implementations, the system 200 can apply one or more masks 232 to the reference view 220 to determine a masked reference view 228. The masks 232 can be similar to masks 128 described with reference to FIG. 1. For example, the masks 232 can identify portion(s) of the 3D scene represented by the scene representation 208, such as to identify portions having objects or other features to be removed, modified, and/or inpainted. The masks 232 can correspond to one or more pixels of the 3D scene, such as one or more pixels of the reference view 220 and/or the masked reference view 228. The system 200 can use the masked reference view 228 to provide guidance over the inpainting process to be performed by image modifier 212 for updating the scene representation 208. As noted above, the system 200 can retrieve and/or determine the masks 232 from the inputs 216.

The system 200, in some implementations, can apply the masked reference view 228 as input to the image modifier 212 to determine a modified reference view 236. For example, the image modifier 212, having been configured in a manner analogous to that described with reference to image modifier 112 of FIG. 1, can modify at least the portions of the reference view 220 corresponding to the mask(s) 232 to determine the modified reference view 236. For example, the image modifier 212 can modify the masked reference view 228 so that the modified reference view 236 has, at one or more pixels corresponding to one or more locations (e.g., 3D location in a frame of reference of the 3D scene) of the masks 232, different features than those represented in the reference view 220, such as to represent background feature(s) relative to a perspective of the camera pose $p_0$ of the reference view 220.

While FIG. 2 depicts the reference view 220 being modified to provide masked reference view 228 prior to modification by the image modifier 212, in some implementations, the image modifier 212 can receive the reference view 220 and mask(s) 232 to determine the modified reference view 236. In some implementations, the image modifier 212 determines a plurality of modified reference views 236 based at least on one or more reference views 220, and the system 200 can select at least one of the plurality of modified reference views 236 for further processing (e.g., based on user input; based on a performance metric associated with the modification of the reference views 220).

Referring further to FIG. 2, the system 200 can determine a reference objective, such as a reference score from an objective function or loss function, according to the modified reference view 236. For example, the system 200 can determine the reference objective as:

$$L_{ref}(\theta) = \|x^{p0} - x_{ref}\|$$

where θ represents parameters of the scene representation 208 (e.g., where $f_\theta$:(p,d)→(c,σ) represents the scene representation 208 as a NeRF as discussed above with respect to scene representation 108), $x^{p0}$ is the output of the scene representation 208, given parameters θ, for the camera pose $p_0$ corresponding to a pose of the reference view 220 (and the modified reference view 236), and $x_{ref}$ is the modified reference view 236. The reference objective can be indicative of and used to determine the scene representation 208 to fit the reference view for the camera pose $p_0$.

In some implementations, the system 200 can determine a context objective, such as a context score from an objective function or loss function, relating to fitting non-masked regions of the scene (e.g., in other camera views). For example, the system 200 can determine the context objective as:

$$L_{context}(\theta) = \mathbb{E}_p\|(1-m^p)\odot x^p(\theta) - (1-m^p)\odot x^p(\theta_{in})\|$$

where $m^p$ represents the mask 232 for a camera pose p, and $x^p(\theta)$ represents the image rendering of $f_\theta$ (e.g., output of the scene representation 208), given parameters θ, into the camera pose p. For example, this can allow the system 200 to configure the scene representation 208 by evaluating $L_{ref}(\theta)+L_{context}(\theta)$, such as to update θ to minimize $L_{ref}(\theta)+L_{context}(\theta)$. For example, subsequent to inpainting the reference view $x_{ref}$ (e.g., to determine modified reference view 236), the system 200 can initialize the scene representation 208 using random weights (e.g., random values for θ), and apply any of a variety of optimization algorithms to reduce or minimize $L_{ref}(\theta)+L_{context}(\theta)$ to fit the reference view $x_{ref}$ for camera pose $p_0$ and the non-masked regions in camera views p other than $p_0$.

Figure 3:
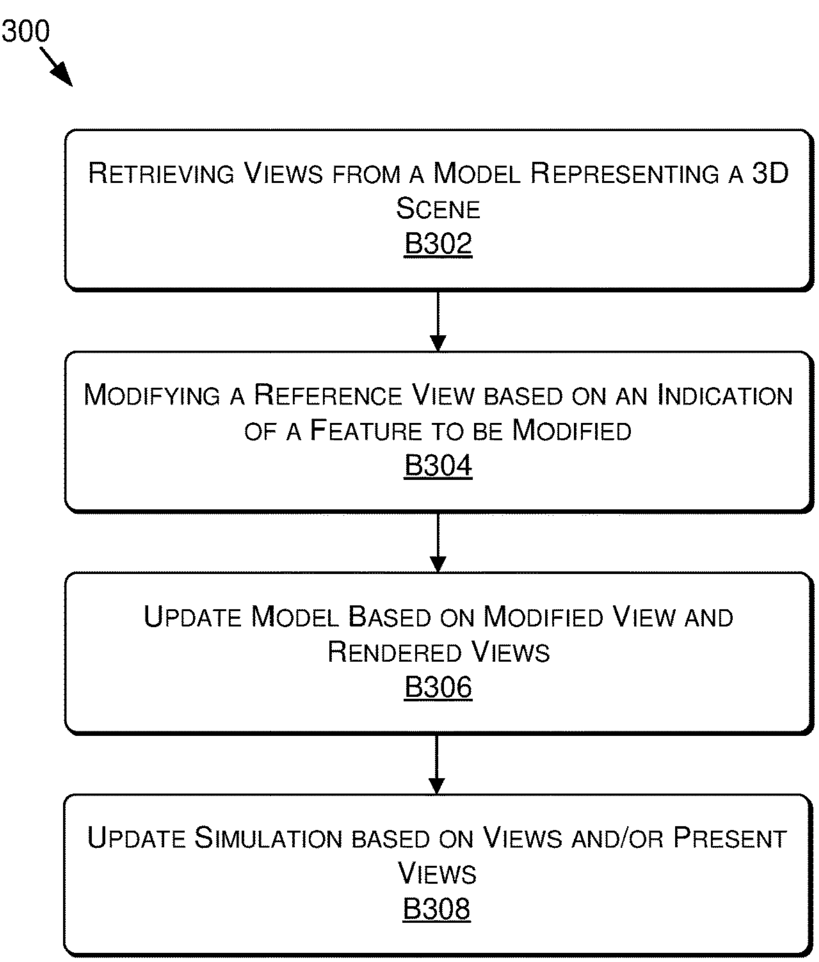
FIG. 3 is a flow diagram of an example of a method for synthetic image generation for neural field modification, in accordance with some embodiments of the present disclosure.

Referring further to FIG. 3, the system 200 can identify and/or retrieve at least one rendered view 224 from the scene representation 208. For example, the at least one rendered view 224 can include a plurality of views of a plurality of camera poses p (which may be the same as or different from the camera poses p used to evaluate $L_{context}$ as described above). The system 200 can randomly select the camera poses p of the rendered views 224. The system 200 can identify the at least one rendered view 224 to have different camera poses p than the camera pose $p_0$ of the reference view 220.

In some implementations, the system 200 diffuses the rendered views 224, such as by applying (e.g., adding) noise to the rendered views 224. The system 200 can apply random amounts of noise (e.g., noise ∈) to each of the rendered views 224. For example, for one or more rendered views 224, the system 200 can add noise to the rendered view(s) 224 to determine diffused rendered view(s) 224, such by adding noise as follows to determine diffused rendered views $x^p_t$ from rendered views $x^p$:

$$x_t^p = \alpha_t x^p + \sigma_t \epsilon$$

As depicted in FIG. 2, the system 200 can apply the diffused rendered views $x^p_t$ as input to the image modifier 212 to cause the image modifier 212 to determine modified rendered views 240 (e.g., by applying the diffused rendered views $x^p_t$ as input to a denoising network of the image modifier 212; a null set of bounding boxes can be applied to account for the image modifier 212 being conditioned on bounding boxes). For example, the modified rendered views 240 can correspond to inpainting of the various diffused rendered views by the denoising network of the image modifier 212. The system 200 can use the modified rendered views 240 for updating the scene representation 208 while preserving scene context.

In some implementations, the system 200 updates the scene representation 208 using an optimization process based on a sampling objective (e.g., output of an objective function or loss function) determined based at least on the modified rendered views 240. By using the sampling objective (e.g., guiding the configuration of the scene representation 208 using the modified rendered views 240), the system 200 can be capable of more effectively avoiding image artifacts.

For example, the system 200 can determine a gradient of the sampling objective, such as a gradient of a score distillation sampling (SDS) loss:

$$\nabla_\theta L_{SDS} = \mathbb{E}_{p,\epsilon,t}\left[w(\hat{\epsilon} - \epsilon)\frac{\partial x^p}{\partial \theta}\right]$$

where $\hat{\epsilon} = \alpha v_\phi(x^p_t; y=\emptyset, x^p_m, m^p, t) + \sigma x^p_t$. For example, the system 200 can use the SDS loss to facilitate ensuring that the renderings from the scene representation 208 have a high likelihood under the prior defined by the image modifier 212. In some implementations, as compared with some SDS processes, the system 200 can operate on strict context as provided by the input frames for the scene representation 208 (e.g., as described with reference to configuring the scene representation 108), as well as restrictions on modifications by the image modifier 212 to the masked region. As such, the system 200 can be enabled, as an example and without limitation, to perform inpainting of selected regions of large, real-world road scenes.

The system 200 can update the scene representation 208 (e.g., update parameters θ) based at least on the gradient of the sampling objective. For example, the system 200 can modify the parameters θ using various optimization algorithms, including but not limited to gradient descent, according to the gradient of the sampling objective. In some implementations, the system 200 modifies the parameters θ based at least on the reference objective and context objective in a first pass, and modifies the parameters θ (e.g., further updates the scene representation 208) based at least on the sampling objective in a second pass. For example, the system 200 can perform the second pass to update the scene representation 208 in a single denoising step. For example, the system 200 can update the parameters θ, based at least on the reference objective and the context objective, to satisfy a first convergence condition (e.g., a first optimization function; minimizing the sum of the reference objective and the context objective; meeting a threshold number of iterations or epochs; or various combinations thereof), and responsive to satisfying the first convergence condition, the system 200 can update the parameters θ, based at least on the sampling objective, to satisfy a second convergence condition (e.g., a second optimization algorithm; performing gradient descent or other operations to minimize the gradient of the sampling objective; meeting a threshold number of iterations or epochs; or various combinations thereof). In some implementations, the system 200 can use any one or more of the reference objective, context objective, and sampling objective in a given iteration of updating the scene representation 208 by modifying the parameters θ based on at least one of the reference objective, context objective, and sampling objective.

Responsive to being updated using the at least one of the reference objective, context objective, or the sampling objective, the updated scene representation 208 can render, provide, and/or otherwise output various views of the 3D scene that may have at least some different content than views from the input scene representation 208. For example, for any of a variety of poses, the updated scene representation 208 can output views of the 3D scene that have at least one pixel in a modified region (e.g., corresponding to a region indicated by mask(s) 232) having a different characteristic than the views as would be retrieved from the same poses from the input scene representation 208. For example, a view retrieved from the updated scene representation 208 can have a first pixel at a first 3D location within a region indicated by the mask 232 that represents a different feature than a second pixel at the first 3D location as would be represented by a view retrieved, for the same camera pose, from the input scene representation 208, and can have a third pixel at a second 3D location outside of the region indicated by the mask 232 that represents the same feature as a fourth pixel at the second 3D location as would be represented by the view retrieved from the input scene representation 208. This can include, for example and without limitation, the updated scene representation 208 outputting views that have objects or classes of objects indicated by the inputs 216 and/or masks 232 being replaced, by inpainting by the image modifier 212 with background features at 3D locations behind the objects relative to the poses of the views.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the systems of FIG. 1 and FIG. 2. However, this method may additionally or alternatively be executed by any one system, or any combination of systems, including, but not limited to, those described herein.

FIG. 3 is a flow diagram showing a method 300 for generating images and other content using neural network models, such as diffusion models and NeRFs, in accordance with some embodiments of the present disclosure. Various operations of the method 300 can be implemented by the same or different devices or entities at various points in time. For example, one or more first devices may implement operations relating to configuring diffusion machine learning models, one or more second devices may implement operations relating to configuring NeRFs, and one or more third devices may implement operations relating to receive user inputs requesting content to be generated by the diffusion machine learning models and/or the NeRFs and presenting or otherwise providing the content. The one or more third devices may maintain the neural network models, or may access the neural network models using, for example and without limitation, APIs provided by the one or more first devices and/or the one or more second devices.

The method 300, at block B302, includes retrieving a plurality of views from a model representing a 3D scene. The model can include a neural network model, such as a NeRF. For example, the model can include a NeRF that is configured using images and/or video of the scene. The views retrieved from the model can include at least one first, reference view, and at least one second view. The second views can be different from the first view, such as to be oriented with respect to different poses (e.g., origin and/or direction of camera orientation) than the first view. Retrieving the plurality of views can include retrieving the plurality of views responsive to a request to modify the model and/or a representation of the 3D scene, such as to remove or inpaint portions of the 3D scene.

Retrieving the at least one second view can include retrieving one or more views from different poses than the first view. For example, the second views can be retrieving by querying the scene model using one or more poses different than a predetermined pose of the first view.

The method 300, at block B304, includes modifying the first view based at least on a feature of the first view to be modified. The feature of the first view can indicate objects, instances, or other features or portions of the first view (as well as the representation of the 3D scene by the model) to be modified, such as by being removed, replaced, inpainted, or otherwise modified. For example, the feature can be received as user input indicative of the feature, such as any of text, speech, voice, image, or video data indicating the feature. In some implementations, the feature can be identified using one or more masks. In some implementations, the feature can be identified by applying a classifier and/or segmentation algorithm to the first view according to input indicative of the feature, such as in response to semantic information (e.g., text, etc.) indicating the feature or a class of the feature. For example, the indication of the feature can include a mask corresponding to one or more pixels of the first view representing the feature.

Modifying the first view can include modifying one or more pixels of the first view representative of the feature. For example, parameters such as color or intensity of the one or more pixels can be modified. In some implementations, the one or more pixels can be modified using a generative model or diffusion model, such as a neural network (e.g., denoising network) that has been configured to modify portions of images to be consistent with remainders of the images. For example, modifying the first view can include modifying the plurality of pixels to instead represent a background of the first view (e.g., represent features of the 3D scene are realistic representations of content (even if synthetic) of the 3D scene behind the feature to be modified from the perspective of the first view). In some implementations, a plurality of candidate first views are determined by the diffusion model, and one (or a subset) of the candidate first views can be selected as the modified first view for further processing, such as for using for guidance of updating of the scene model to account for the modification.

The method 300, at block B306, includes updating the model (e.g., updating the NeRF) based at least on the modified first view and the at least one second view. In some implementations, one or more objective functions and/or loss functions can be evaluated based on at least the modified first view and the at least one second view. For example, at least some of the views can be used to evaluate how well the model modifies the masked portion of the first view while retaining consistent content outside of the masked portion across the plurality of views.

The method 300, at block B308, includes causing at least one of (i) a simulation to be performed using an updated view retrieved from the updated model or (ii), presentation of the updated view using a display. For example, the NeRF can be used to represent a 3D scene for simulation of autonomous vehicle operation, and modifying the NeRF can include removing features such as parked vehicles to facilitate training a controller (e.g., sensor/control software and/or firmware, etc. of the autonomous vehicle) using the simulation and the 3D scene. The views rendered by the NeRF can be provided to the simulation. The views rendered by the NeRF can be presented using a display device.

Example Content Streaming System

Figure 4:
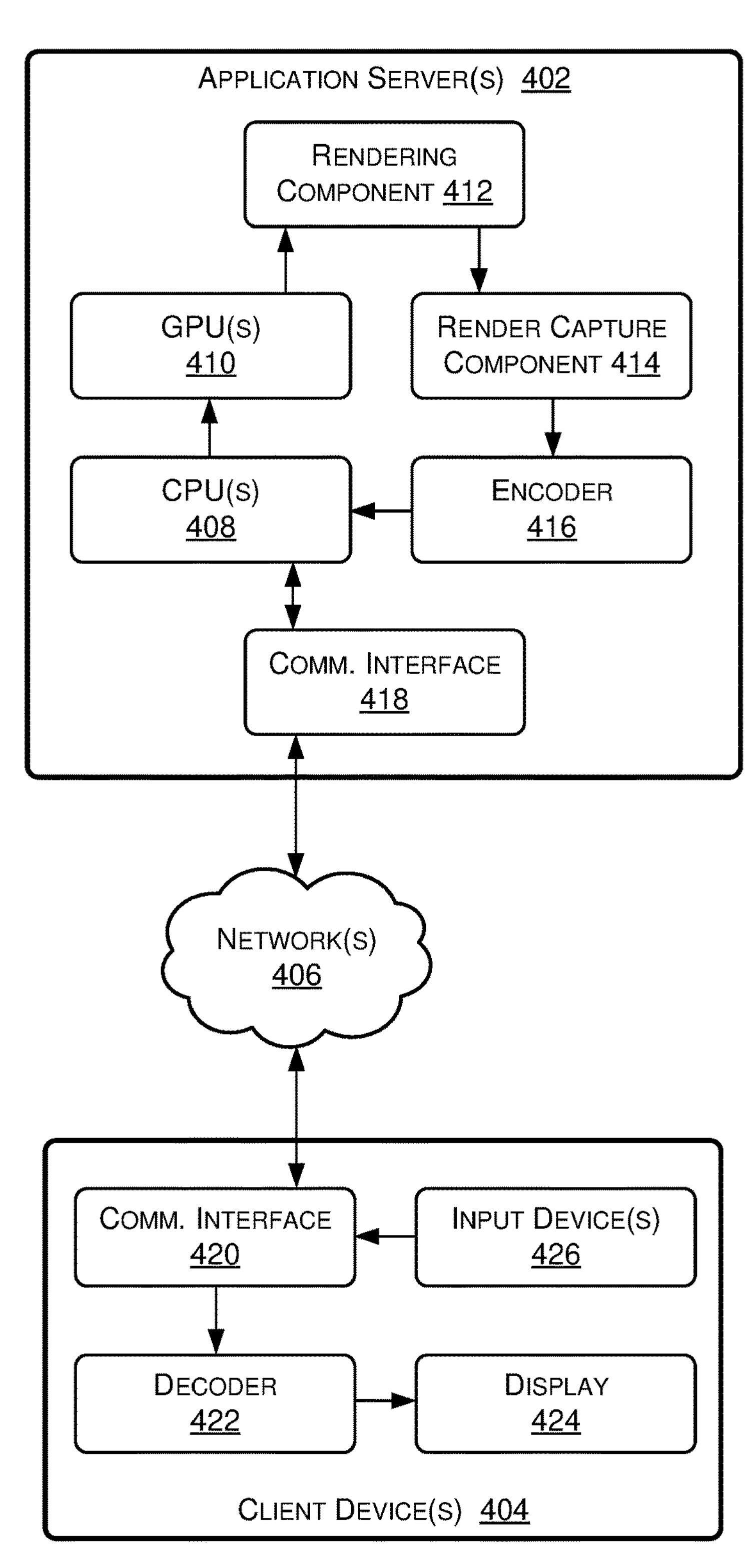
FIG. 4 is a block diagram of an example content streaming system suitable for use in implementing some embodiments of the present disclosure.

Now referring to FIG. 4, FIG. 4 is an example system diagram for a content streaming system 400, in accordance with some embodiments of the present disclosure. FIG. 4 includes application server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network(s) described herein). In some embodiments of the present disclosure, the system 400 may be implemented to perform diffusion model and NeRF training and runtime operations. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 400 can be implemented to receive input indicating one or more features of output to be generated using a neural network model, provide the input to the model to cause the model to generate the output, and use the output for various operations including display or simulation operations.

In the system 400, for an application session, the client device(s) 404 may only receive input data in response to inputs to the input device(s), transmit the input data to the application server(s) 402, receive encoded display data from the application server(s) 402, and display the display data on the display 424. As such, the more computationally intense computing and processing is offloaded to the application server(s) 402 (e.g., rendering—in particular ray or path tracing—for graphical output of the application session is executed by the GPU(s) of the game server(s) 402). In other words, the application session is streamed to the client device(s) 404 from the application server(s) 402, thereby reducing the requirements of the client device(s) 404 for graphics processing and rendering.

For example, with respect to an instantiation of an application session, a client device 404 may be displaying a frame of the application session on the display 424 based on receiving the display data from the application server(s) 402. The client device 404 may receive an input to one of the input device(s) and generate input data in response, such as to provide modification inputs of a driving signal for use by modifier 112. The client device 404 may transmit the input data to the application server(s) 402 via the communication interface 420 and over the network(s) 406 (e.g., the Internet), and the application server(s) 402 may receive the input data via the communication interface 418. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 412 may render the application session (e.g., representative of the result of the input data) and the render capture component 414 may capture the rendering of the application session as display data (e.g., as image data capturing the rendered frame of the application session). The rendering of the application session may include ray or path-traced lighting and/or shadow effects, computed using one or more parallel processing units-such as GPUs, which may further employ the use of one or more dedicated hardware accelerators or processing cores to perform ray or path-tracing techniques—of the application server(s) 402. In some embodiments, one or more virtual machines (VMs)—e.g., including one or more virtual components, such as vGPUs, vCPUs, etc.—may be used by the application server(s) 402 to support the application sessions. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424.

Example Computing Device

Figure 5:
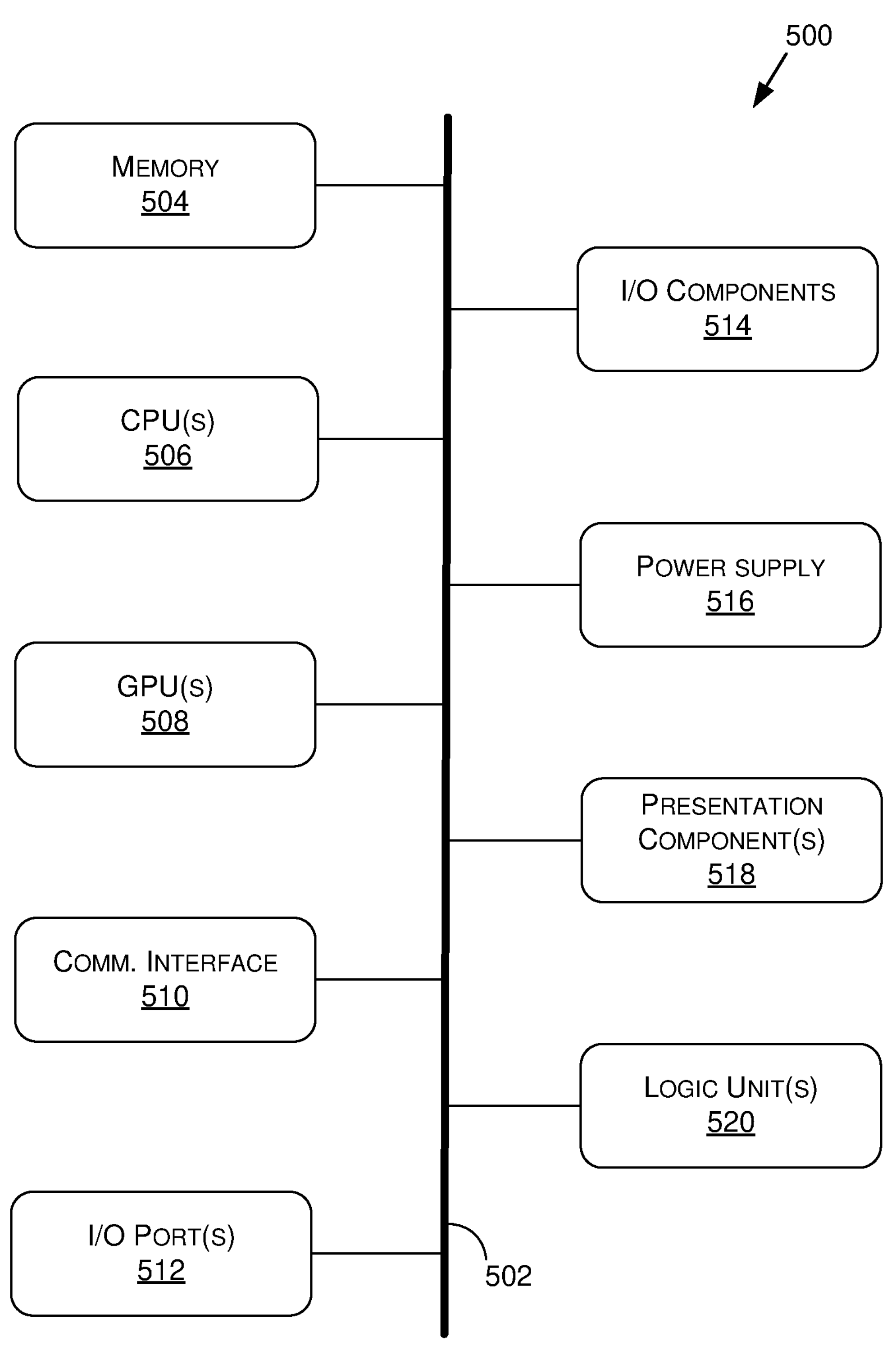
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may be arranged in various topologies, including but not limited to bus, star, ring, mesh, tree, or hybrid topologies. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.)

that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that allow the computing device 500 to communicate with other computing devices via an electronic communication network, included wired and/or wireless communications. The communication interface 510 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508. In some embodiments, a plurality of computing devices 500 or components thereof, which may be similar or different to one another in various respects, can be communicatively coupled to transmit and receive data for performing various operations described herein, such as to facilitate latency reduction.

The I/O ports 512 may allow the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user, such as to generate a driving signal for use by modifier 112, or a reference image (e.g., images 104). In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that allow detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to allow the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
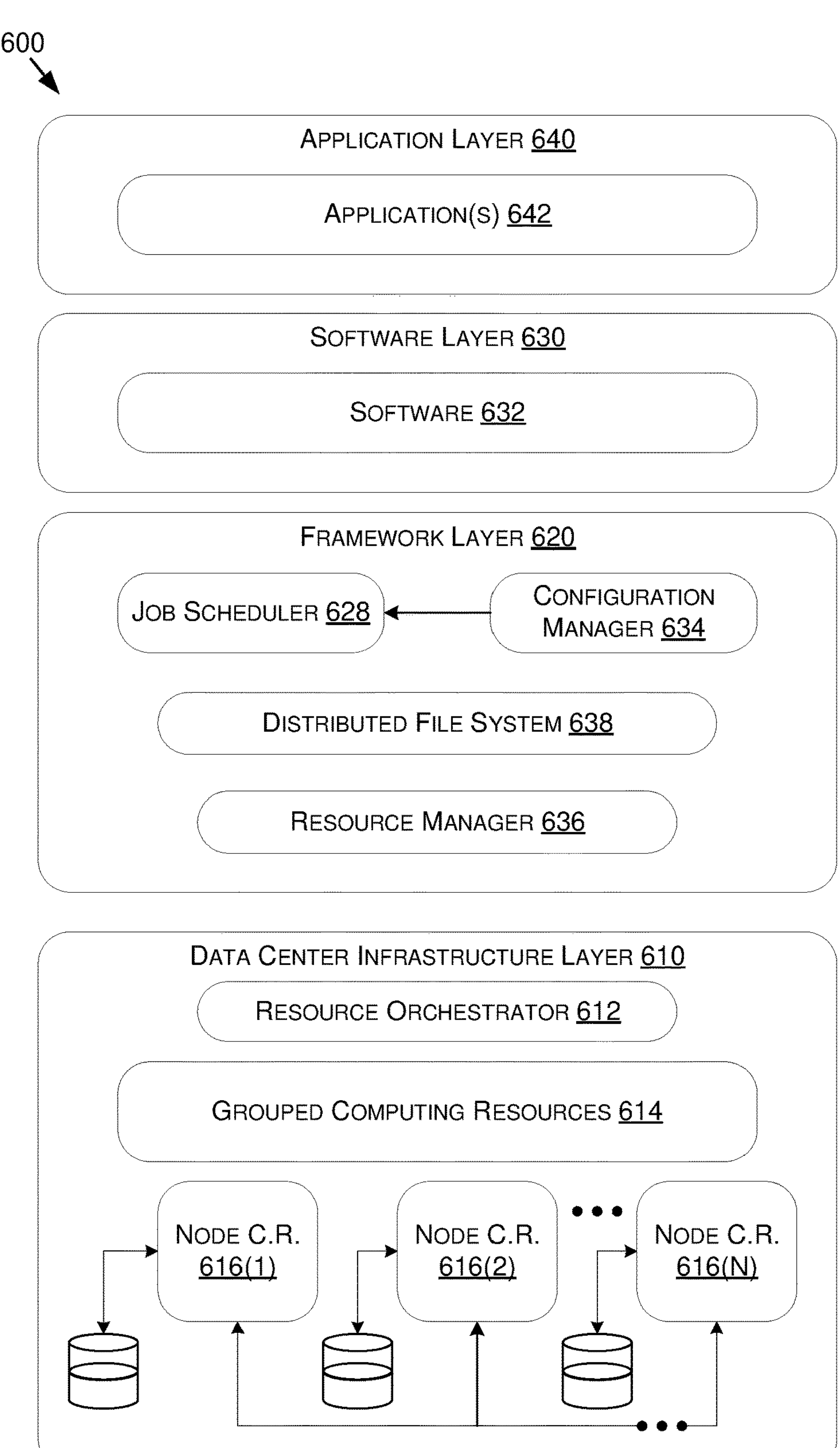
FIG. 6 is a block diagram of an example data center suitable for use in implementing some embodiments of the present disclosure.

FIG. 6 illustrates an example data center 600 that may be used in at least one embodiments of the present disclosure, such as to implement the image processing system 100 in one or more examples of the data center 600. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 628, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 628 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 628. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to train, configure, update, and/or execute machine learning models 104, 204.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models (e.g., train machine learning models 104, 204 and/or scene models 108, 208, and/or image modifiers 112, 212) or predict or infer information using one or more machine learning models (e.g., machine learning models of modifier 112) according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:

one or more circuits to:

retrieve, from a neural network representing a three-dimensional (3D) scene, (i) at least one first view of the 3D scene and (ii) at least one second view of the 3D scene, the at least one second view different from the at least one first view;

modify the at least one first view based at least on an indication of a feature of the at least one first view to be modified;

update the neural network by modifying at least one parameter of the neural network based at least on the modified at least one first view and the at least one second view, wherein the at least one second view is used as a context objective in updating the neural network to preserve at least one value for a non-masked region of the 3D scene; and cause at least one of (i) a simulation to be performed using an updated view from the updated neural network or (ii), presentation of the updated view using a display.

2. The processor of claim 1, wherein the feature of the at least one first view to be modified comprises an object, and the one or more circuits are to modify the at least one first view by modifying a plurality of pixels of the at least one first view that represent the object to instead represent a background of the object in the 3D scene.

3. The processor of claim 1, wherein the feature of the at least one first view is a first feature represented by at least one first pixel of the at least one first view, the at least one first pixel corresponds to a location of the 3D scene, and the updated neural network provides the updated view to have at least one second pixel corresponding to the location, the at least one second pixel representing a second feature different than the first feature.

4. The processor of claim 1, wherein the indication of the feature comprises a mask corresponding to one or more pixels of the at least one first view representing the feature.

5. The processor of claim 1, wherein the indication of the feature comprises at least one of text data or speech data.

6. The processor of claim 1, wherein the one or more circuits are to:

apply a classifier to the indication of the feature to determine a class of features;

identify the feature based at least on the determined class of features; and modify the at least one first view responsive to identifying the feature.

7. The processor of claim 1, wherein the one or more circuits are to modify the at least one first view by applying the indication of the feature as input to a generative machine learning model.

8. The processor of claim 7, wherein the generative machine learning model comprises a diffusion model that is updated based at least on a first image having a mask, and an indication of a bounding box.

9. The processor of claim 1, wherein the neural network comprises the neural network representing a neural radiance field (NeRF), wherein the neural network corresponds to a representation of an image data structure generated by the neural network.

10. The processor of claim 1, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system comprising one or more large language models (LLMs);

a system for generating synthetic data;

a system incorporating one or more virtual machines (VMs);

a system implemented at least partially in a data center; or a system implemented at least partially using cloud computing resources.

11. The processor of claim 1, wherein the one or more circuits are to:

modify the at least one second view using a denoising network to obtain a modified at least one second view; and update the neural network based at least on the modified at least one second view.

12. A system comprising:

one or more processing units to execute operations comprising:

retrieving, from a neural network representing of a three-dimensional (3D) scene, (i) at least one first view of the 3D scene and (ii) at least one second view of the 3D scene, the at least one second view different from the at least one first view;

modifying the at least one first view based at least on an indication of a feature of the at least one first view to be modified;

updating the neural network by modifying at least one parameter of the neural network based at least on the modified at least one first view and the at least one second view, wherein the at least one second view is used as a context objective in updating the neural network to preserve at least one value for a non-masked region of the 3D scene; and causing at least one of (i) a simulation to be performed using an updated view retrieved from the updated neural network or (ii), presentation of the updated view using a display.

13. The system of claim 12, wherein the feature of the at least one first view to be modified comprises an object, and the one or more processing units are to modify the at least one first view by modifying a plurality of pixels of the at least one first view that represent the object, to instead represent a background of the object in the 3D scene.

14. The system of claim 12, wherein the feature of the at least one first view is a first feature represented by at least one first pixel of the at least one first view, the at least one first pixel corresponds to a location of the 3D scene, and the updated neural network provides the updated view to have at least one second pixel corresponding to the location, that represents a second feature different than the first feature.

15. The system of claim 12, wherein:

the indication of the feature comprises at least one of text data or speech data; and the one or more processing units are to:

apply a classifier to the at least one of the text data or the speech data to determine a class of features;

identify the feature based at least on the determined class of features; and modify the at least one first view responsive to identifying the feature.

16. The system of claim 12, wherein the one or more processing units are to modify the at least one first view by applying the indication of the feature as input to a generative machine learning model, wherein the generative machine learning model comprises a diffusion model that is configured based at least on a first image having a mask, and an indication of a bounding box.

17. The system of claim 12, wherein the neural network comprises a neural radiance field (NeRF), wherein the neural network corresponds to a representation of an image data structure generated by the NeRF.

18. The system of claim 12, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system comprising one or more large language models (LLMs);

a system for generating synthetic data;

a system incorporating one or more virtual machines (VMs);

a system implemented at least partially in a data center; or a system implemented at least partially using cloud computing resources.

19. A method, comprising:

retrieving, by one or more processors, from a neural network representing of a three-dimensional (3D) scene, (i) at least one first view of the 3D scene and (ii) at least one second view of the 3D scene, the at least one second view different from the at least one first view;

modifying, by the one or more processors, the at least one first view based at least on an indication of a feature of the at least one first view to be modified;

updating, by the one or more processors, the neural network by modifying at least one parameter of the neural network based at least on the modified at least one first view and the at least one second view, wherein the at least one second view is used as a context objective in updating the neural network to preserve at least one value for a non-masked region of the 3D scene; and causing, by the one or more processors, at least one of (i) a simulation to be performed using an updated view retrieved from the updated neural network or (ii), presentation of the updated view using a display.

20. The method of claim 19, wherein the feature of the at least one first view to be modified comprises an object, and the method further comprises modifying, by the one or more processors, the at least one first view by modifying a plurality of pixels of the at least one first view that represent the object, to instead represent a background of the object in the 3D scene.

* * * * *